(12) United States Patent
Figueroa et al.

(10) Patent No.: US 8,468,366 B2
(45) Date of Patent: Jun. 18, 2013

(54) METHOD FOR SECURELY STORING A PROGRAMMABLE IDENTIFIER IN A COMMUNICATION STATION

(75) Inventors: David Figueroa, Carlsbad, CA (US); James A. Hutchison, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1162 days.

(21) Appl. No.: 12/054,318

(22) Filed: Mar. 24, 2008

(65) Prior Publication Data

US 2009/0240954 A1    Sep. 24, 2009

(51) Int. Cl.
*G06F 21/00* (2006.01)

(52) U.S. Cl.
USPC ........................................................ 713/193

(58) Field of Classification Search
USPC .................. 713/150, 189, 193; 380/255, 270
See application file for complete search history.

(56) References Cited

U.S. PATENT DOCUMENTS

| | | | | |
|---|---|---|---|---|
| 5,954,817 A * | 9/1999 | Janssen et al. | | 713/169 |
| 6,026,293 A * | 2/2000 | Osborn | | 455/411 |
| 6,167,252 A * | 12/2000 | Cohen | | 455/410 |
| 6,223,290 B1 * | 4/2001 | Larsen et al. | | 726/3 |
| 6,604,153 B2 | 8/2003 | Imamura et al. | | |
| 7,734,933 B1 * | 6/2010 | Marek et al. | | 713/193 |
| 2002/0187787 A1 * | 12/2002 | Fry | | 455/445 |
| 2005/0197102 A1 * | 9/2005 | Kim | | 455/410 |
| 2006/0236111 A1 | 10/2006 | Bodensjo et al. | | |
| 2007/0050622 A1 * | 3/2007 | Rager et al. | | 713/168 |
| 2007/0192610 A1 | 8/2007 | Chun et al. | | |
| 2008/0189539 A1 * | 8/2008 | Hsu | | 713/2 |

FOREIGN PATENT DOCUMENTS

| | | |
|---|---|---|
| CN | 1682488 A | 10/2005 |
| EP | 1415430 | 7/2005 |
| JP | 8340579 A | 12/1996 |
| JP | 10207776 A | 8/1998 |
| JP | 11259285 A | 9/1999 |
| JP | 2004502233 A | 1/2004 |
| JP | 2004356870 A | 12/2004 |
| JP | 2005148934 A | 6/2005 |
| JP | 2005235221 A | 9/2005 |
| JP | 2005539304 A | 12/2005 |

(Continued)

OTHER PUBLICATIONS

International Search Report and Written Opinion—PCT/US2009/038132—ISA/EPO—Jan. 22, 2010.
Taiwan Search Report—TW098109638—TIPO—Oct. 24, 2012.

*Primary Examiner* — Darren B Schwartz
*Assistant Examiner* — John B King
(74) *Attorney, Agent, or Firm* — Kevin Cheatham

(57) ABSTRACT

Disclosed is a method for storing an identifier in a first station having a secure non-volatile data store protected by cryptographic data, an identifier flag for indicating that the identifier has been written to the secure data store, and an authenticated trust agent that prohibits writing of an identifier to the secure data store if the identifier flag is set. In the method, the identifier is written to the secure non-volatile data store, wherein the identifier written to the secure data store is encrypted using the cryptographic data. The identifier flag is irreversibly set after writing the identifier to the secure data store so that the trust agent prohibits another write of an identifier to the secure data store.

31 Claims, 3 Drawing Sheets

FOREIGN PATENT DOCUMENTS

| | | |
|---|---|---|
| JP | 2006270209 A | 10/2006 |
| JP | 2009526333 A | 7/2009 |
| KR | 19980064829 | 10/1998 |
| TW | I229534 B | 3/2005 |
| TW | I257236 B | 6/2006 |
| TW | I295135 B | 3/2008 |
| WO | WO 01/17163 | 3/2001 |

* cited by examiner

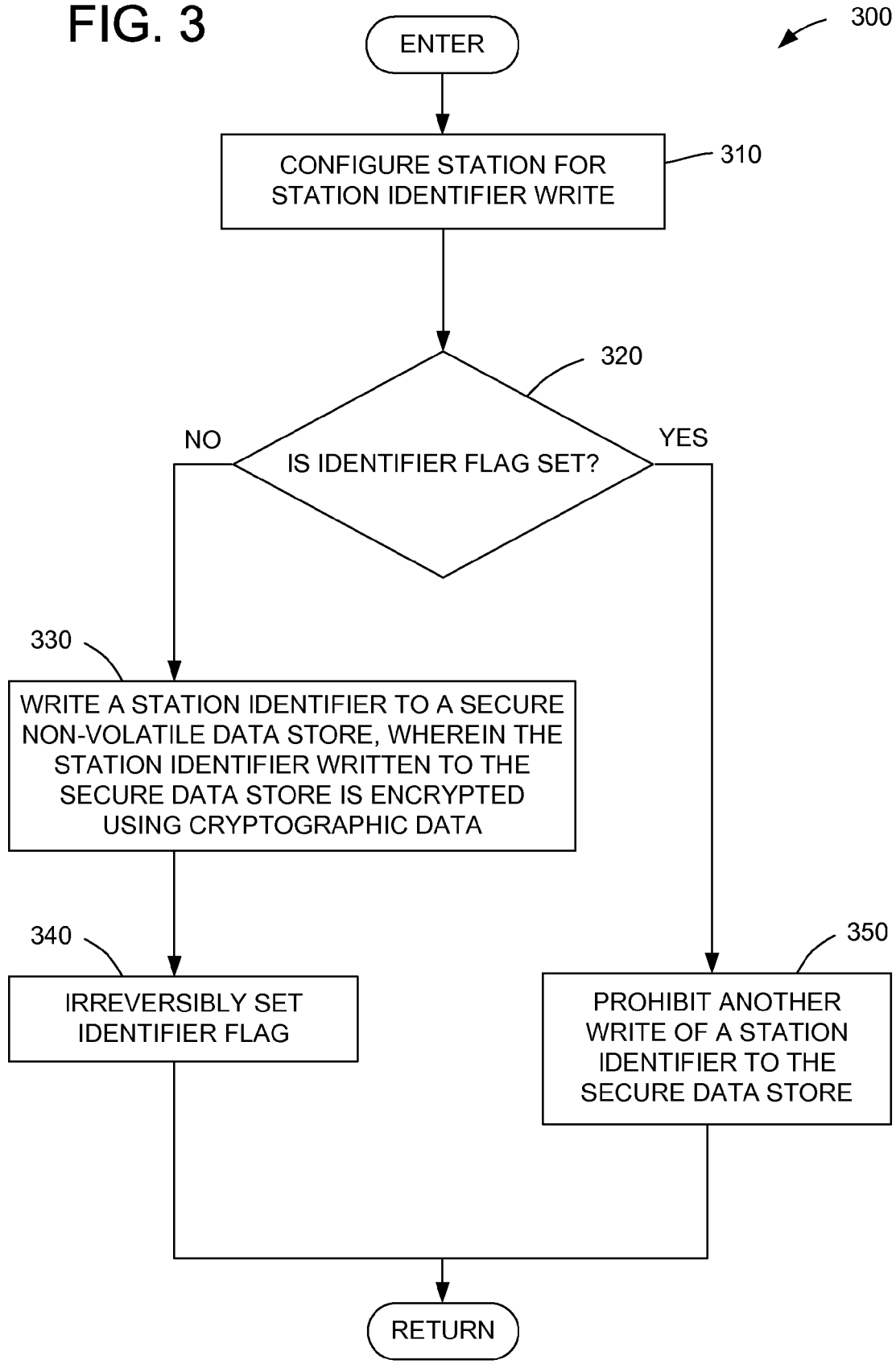

METHOD FOR SECURELY STORING A PROGRAMMABLE IDENTIFIER IN A COMMUNICATION STATION

BACKGROUND

1. Field

The present invention relates generally to securing an identifier in a communication station.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (3) the standard offered by a consortium named "3rd Generation Partnership Project 2" (3GPP2) and embodied in "TR-45.5 Physical Layer Standard for cdma2000 Spread Spectrum Systems" (the IS-2000 standard).

In the above named CDMA communication systems and standards, the available spectrum is shared simultaneously among a number of users, and suitable techniques are available to provide services, such as voice and data services.

A typical mobile station has a unique identifier written during manufacture for distinguishing the station from other stations. Unscrupulous persons have replaced such station identifiers by, for example, replacing memory chips and the like, to overcome service provider agreements and/or make illicit use of a station.

There is therefore a need for the secure storage of a unique identifier in a communication station, in a cost effective and efficient manner.

SUMMARY

An aspect of the present invention may reside in a method for storing an identifier in a first station having a secure non-volatile data store protected by cryptographic data, an identifier flag for indicating that the identifier has been written to the secure data store, and an authenticated trust agent that prohibits writing of an identifier to the secure data store if the identifier flag is set. In the method, the identifier is written to the secure non-volatile data store, wherein the identifier written to the secure data store is encrypted using the cryptographic data. The identifier flag is irreversibly set after writing the identifier to the secure data store so that the trust agent prohibits another write of an identifier to the secure data store.

In more detailed aspects of the invention, the first station may further comprise an integrated chip including an integrated processor, and including an integrated data store for storing the cryptographic data. Also, the first station may further comprise a secure mobile station modem including the trust agent, and may further comprise a secure file system including the secure data store. The identifier flag may be a one-time-programmable memory bit in the secure mobile station modem. Further, the first station may comprise an authenticated operating system including the trust agent such that the trust agent is a software element of the authenticated operating system. In one aspect, the identifier flag may be set only by an authenticated software routine.

In other more detailed aspects of the invention, the secure data store may comprise a flash memory device, and the cryptographic data may include a device key. A device key is a data value (e.g., 128 bits) assigned to the first station. Additionally, the first station may comprise a mobile telephone, and the identifier may comprise a mobile equipment identifier, such as an International Mobile Equipment Identity (IMEI) or a Mobile Equipment Identifier (MEID). The identifier may facilitate communication with a second station.

Another aspect of the invention may reside in a mobile station including a secure non-volatile data store, an identifier flag, and an authenticated trust agent. The secure non-volatile data store is protected by cryptographic data, wherein an identifier written to the secure data store is encrypted using the cryptographic data. The identifier flag indicates that the identifier has been written to the secure data store, wherein the setting of the identifier flag is irreversible. The authenticated trust agent prohibits writing of an identifier to the secure data store if the identifier flag is set based on a write of the identifier to the secure data store so that the trust agent prohibits another write of an identifier to the secure data store.

Another aspect of the invention may reside in a first station comprising means for secure non-volatile data storage protected by cryptographic data, identifier flag means for indicating that an identifier has been written to the secure data store, authenticated trust means for prohibiting writing of an identifier to the secure data store if the identifier flag is set, means for writing an identifier to the secure non-volatile data store, wherein the identifier written to the secure data store is encrypted using the cryptographic data, and means for irreversibly setting the identifier flag after the identifier is written to the secure data store so that the trust agent prohibits another write of an identifier to the secure data store.

Yet another aspect of the invention may reside is computer program product comprising computer readable medium comprising code for causing a computer to write a station identifier to a secure non-volatile data store, wherein the station identifier written to the secure data store is encrypted using cryptographic data, and code for causing a computer to irreversibly set an identifier flag after writing the station identifier to the secure data store so that an authenticated trust agent prohibits another write of a station identifier to the secure data store.

BRIEF DESCRIPTION OF THE DRAWINGS

FIG. 3 is a flow diagram of a method for securely storing a unique identifier in a communication station.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
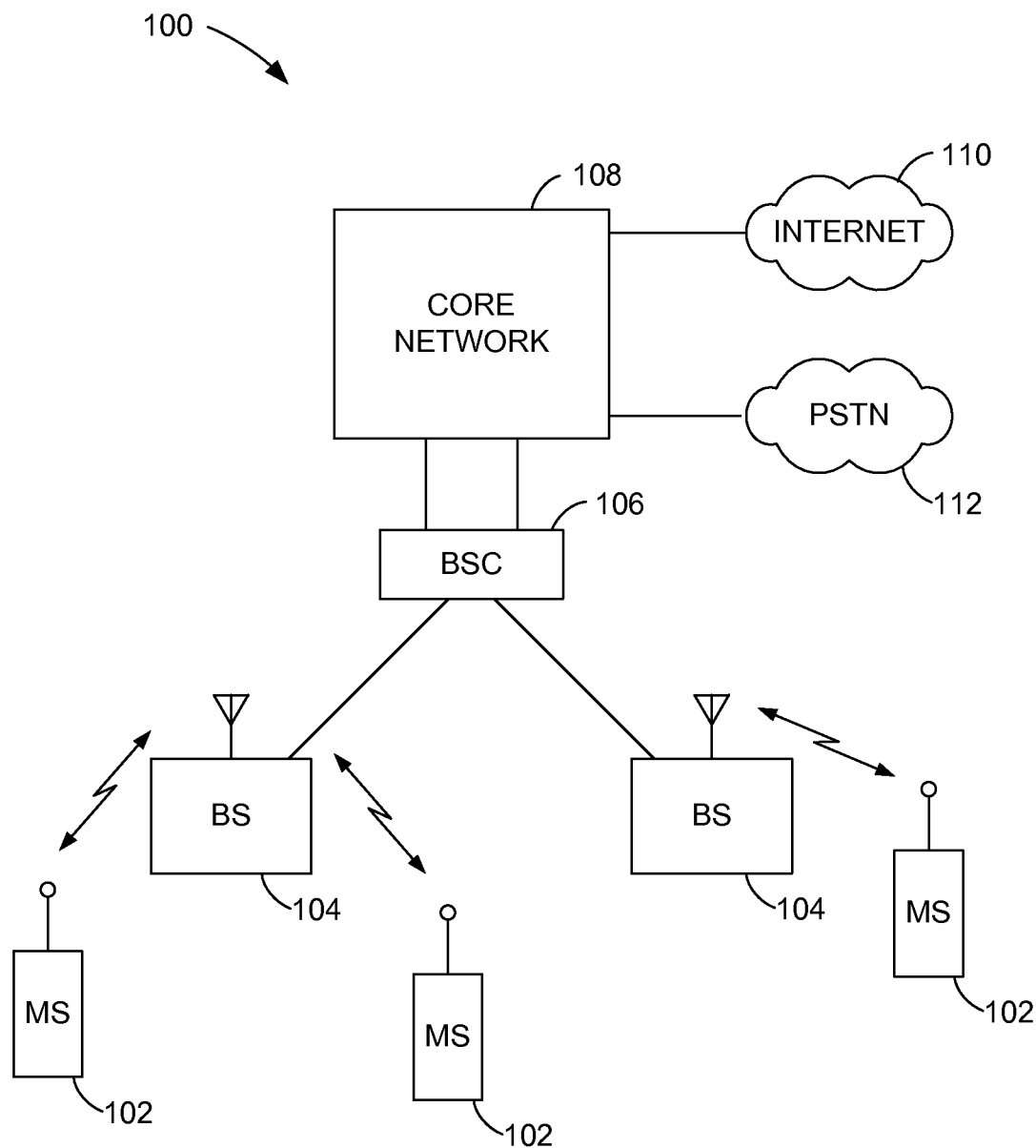
FIG. 1 is a block diagram of an example of a wireless communication system.

With reference to FIG. 1, a wireless communication system 100 includes one or more wireless mobile stations (MS) 102, one or more base stations (BS) 104, one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 2:
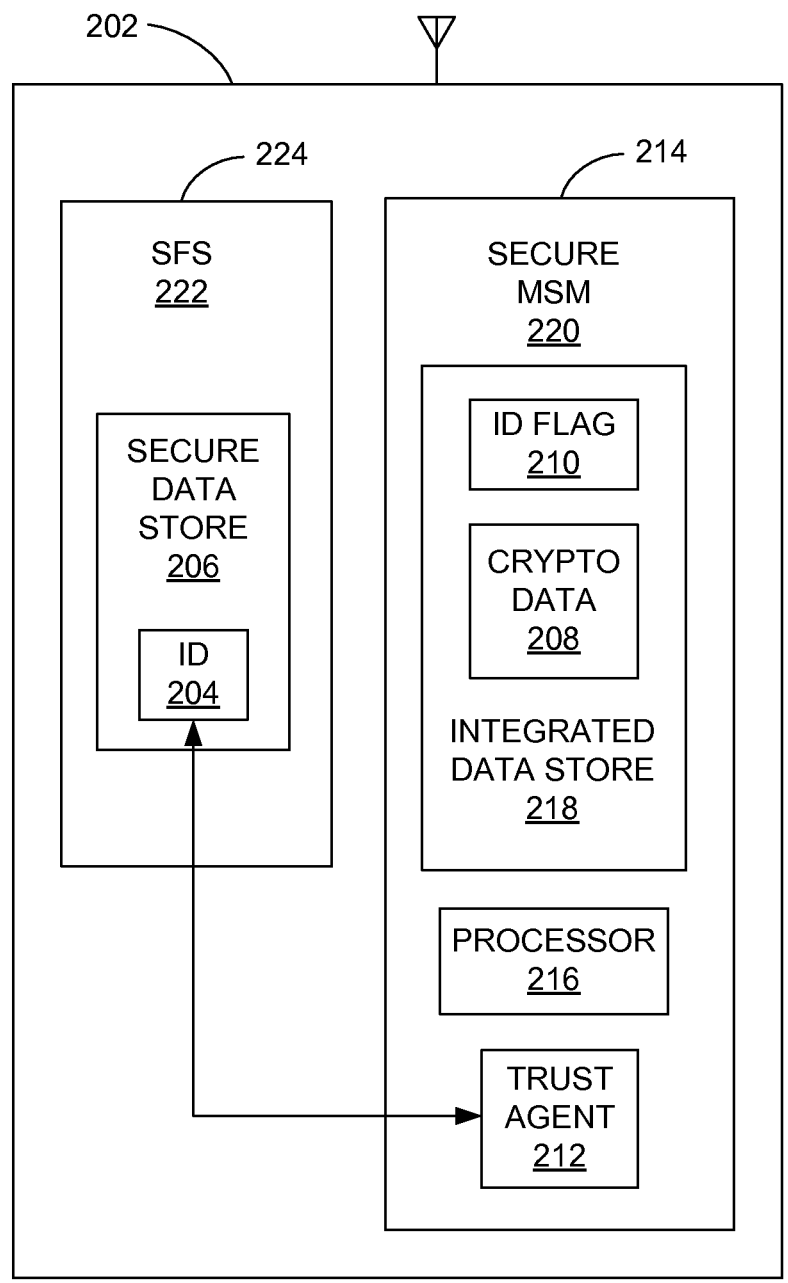
FIG. 2 is a block diagram of a mobile station having a secure data storage device for storing a station identifier protected by cryptographic data.

With reference to FIGS. 2 and 3, an aspect of the present invention may reside in a method 300 for storing an identifier 204 in a station 202. The station has a secure non-volatile data store 206 protected by cryptographic data 208, an identifier flag 210 for indicating that the identifier has been written to the secure data store, and an authenticated trust agent 212 that prohibits writing of an identifier to the secure data store if the identifier flag is set. In the method, the station is configured for a write of the station identifier to the secure data store (step 310), and the identifier flag is checked (step 320). If the identifier flag is not set, the identifier is written to the secure non-volatile data store. The identifier written to the secure data store is encrypted using the cryptographic data (step 330). The identifier flag is irreversibly set (step 340) after writing the identifier to the secure data store so that the trust agent prohibits another write of an identifier to the secure data store (step 350).

The identifier flag 210 may be protected by cryptographic data. For example, the identifier flag may be a one-time-programmable memory bit, and may be set only by an authenticated software routine.

The station 202 may further comprise an integrated chip 214 including an integrated processor 216, and including an integrated data store 218 for storing the cryptographic data 208. Also, the station may further comprise a secure mobile station modem (MSM) 220 including the trust agent 212, and further comprise a secure file system (SFS) 222 including the secure data store 206. Further, the first station may comprise an authenticated operating system including the trust agent 212 such that the trust agent is a software element of the authenticated operating system.

The secure data store 206 may comprise a flash memory device 224, and the cryptographic data 208 may include a device key. A device key is a data value (e.g., 128 bits) assigned to the first station. Additionally, the station 202 may comprise a mobile telephone 102, and the identifier 204 may comprise a mobile equipment identifier such as an International Mobile Equipment Identity (IMEI), or a Mobile Equipment Identifier (MEID). The identifier may facilitate communication with a second station 104.

Another aspect of the invention may reside in a mobile station 202 including a secure non-volatile data store 206, an identifier flag 210, and an authenticated trust agent 212. The secure non-volatile data store is protected by cryptographic data 208. An identifier 204 written to the secure data store is encrypted using the cryptographic data. The identifier flag indicates that the identifier has been written to the secure data store. The setting of the identifier flag is irreversible. The authenticated trust agent prohibits writing of an identifier to the secure data store if the identifier flag is set based on a write of the identifier to the secure data store so that the trust agent prohibits another write of an identifier to the secure data store.

Another aspect of the invention may reside in a first station 202 comprising means for secure non-volatile data storage 206 protected by cryptographic data 208, identifier flag means 210 for indicating that an identifier 204 has been written to the secure data store, authenticated trust means 212 for prohibiting writing of an identifier to the secure data store if the identifier flag is set, means for writing an identifier to the secure non-volatile data store 220, wherein the identifier written to the secure data store is encrypted using the cryptographic data, and means 220 for irreversibly setting the identifier flag after the identifier is written to the secure data store so that the trust agent prohibits another write of an identifier to the secure data store.

Yet another aspect of the invention may reside is computer program product comprising computer readable medium 218 comprising code for causing a computer to write a station identifier 204 to a secure non-volatile data store 206, wherein the station identifier written to the secure data store is encrypted using cryptographic data 208, and code for causing a computer to irreversibly set an identifier flag 210 after writing the station identifier to the secure data store so that an authenticated trust agent 212 prohibits another write of a station identifier to the secure data store.

Typically, the station identifier 204 may be written during manufacture of a communication station 202 such as a mobile station. For example, a mobile station may be connected to setup tool or computer (not shown). The setup computer may issue a command or request packet to place the mobile station into a mode for writing the identifier 204. The setup computer may supply the identifier (e.g., an IMEI) with an identifier write command. The setup computer may issue a request packet to determine whether the identifier write operation was successfully completed.

After the identifier flag 210 has been set, the setup computer cannot rewrite the identifier 210. Similarly, an illicit change of the identifier cannot be effected since the identifier flag 210 and the trust agent 212 prohibit such action. Replacing the memory device will be futile because the device key(s) and/or certificate(s) of the cryptographic data 208 are not accessible, and the data stored in the illicit memory will not yield properly encrypted and authenticated results due to the protection provided by the cryptographic data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for storing an identifier in a first station having a secure non-volatile data store protected by cryptographic data, an identifier flag for indicating that the identifier has been written to the secure non-volatile data store, and an authenticated trust agent that prohibits writing of an identifier to the secure non-volatile data store when the identifier flag is set, the method comprising:

writing the identifier to the secure non-volatile data store, wherein the identifier written to the secure data store is encrypted using the cryptographic data; and irreversibly setting the identifier flag after writing the identifier to the secure non-volatile data store so that the authenticated trust agent prohibits another write of an identifier to the secure non-volatile data store, wherein the first station further comprises an authenticated operating system including the authenticated trust agent such that the authenticated trust agent is a software element of the authenticated operating system.

2. The method for storing an identifier as defined in claim 1, wherein the first station further comprises an integrated chip including an integrated processor, and including an integrated data store for storing the cryptographic data.

3. The method for storing an identifier as defined in claim 1, wherein the first station further comprises a secure mobile station modem including the authenticated operating system.

4. The method for storing an identifier as defined in claim 3, wherein the identifier flag is a one-time-programmable memory bit in the secure mobile station modem.

5. The method for storing an identifier as defined in claim 1, wherein the identifier flag is set only by an authenticated software routine.

6. The method for storing an identifier as defined in claim 1, wherein the first station further comprises a secure file system including the secure non-volatile data store.

7. The method for storing an identifier as defined in claim 1, wherein the secure non-volatile data store comprises a flash memory device.

8. The method for storing an identifier as defined in claim 1, wherein the cryptographic data includes a device key.

9. The method for storing an identifier as defined in claim 8, wherein the device key is a data value assigned to the first station.

10. The method for storing an identifier as defined in claim 1, wherein:
the first station comprises a mobile telephone; and
the identifier comprises a mobile equipment identifier.

11. The method for storing an identifier as defined in claim 1, wherein the identifier facilitates communication with a second station.

12. A first station, comprising:
a secure non-volatile data store protected by cryptographic data, wherein an identifier written to the secure non-volatile data store is encrypted using the cryptographic data;
an identifier flag for indicating that the identifier has been written to the secure non-volatile data store, wherein setting of the identifier flag is irreversible;
an authenticated trust agent that prohibits writing of an identifier to the secure non-volatile data store when the identifier flag is set based on a write of the identifier to the secure non-volatile data store so that the authenticated trust agent prohibits another write of an identifier to the secure non-volatile data store; and
an authenticated operating system including the authenticated trust agent such that the authenticated trust agent is a software element of the authenticated operating system.

13. The first station as defined in claim 12, wherein the first station further comprises an integrated chip including an integrated processor, and including an integrated data store for storing the cryptographic data.

14. The first station as defined in claim 12, further comprising a secure mobile station modem that includes the authenticated operating system.

15. The first station as defined in claim 14, wherein the identifier is a one-time-programmable memory bit in the secure mobile station modem.

16. The first station as defined in claim 12, wherein the identifier flag is set only by an authenticated software routine.

17. The first station as defined in claim 12, further comprising a secure file system that includes the secure non-volatile data store.

18. The first station as defined in claim 12, wherein the secure non-volatile data store comprises a flash memory device.

19. The first station as defined in claim 12, wherein the cryptographic data includes a device key.

20. The first station as defined in claim 19, wherein the device key is a data value assigned to the first station.

21. The first station as defined in claim 12, wherein:
the first station comprises a mobile telephone; and
the identifier comprises a mobile equipment identifier.

22. The first station as defined in claim 12, wherein the identifier facilitates communication with a second station.

23. A first station, comprising:
means for secure non-volatile data storage protected by cryptographic data;
identifier flag means for indicating that an identifier has been written to the secure non-volatile data store;
authenticated trust means for prohibiting writing of an identifier to the secure non-volatile data store when an identifier flag is set;
means for writing the identifier to the secure non-volatile data store, wherein the identifier written to the secure data store is encrypted using the cryptographic data;
means for irreversibly setting the identifier flag after the identifier is written to the secure non-volatile data store so that an authenticated trust agent prohibits another write of an identifier to the secure non-volatile data store; and
an authenticated operating system means including the authenticated trust means such that the authenticated trust means is a software element of the authenticated operating system means.

24. The first station as defined in claim 23, wherein the cryptographic data includes a device key.

25. The first station as defined in claim 23, wherein:
the station comprises a mobile telephone; and
the identifier comprises mobile equipment identifier.

26. The first station as defined in claim 23, wherein the identifier facilitates communication with a second station.

27. A computer program product, comprising:
non-transitory computer readable medium comprising:
code for causing a computer to write a station identifier to a secure non-volatile data store, wherein the station identifier written to the secure non-volatile data store is encrypted using cryptographic data;
code for causing a computer to irreversibly set an identifier flag after writing the station identifier to the secure non-volatile data store so that an authenticated trust agent prohibits another write of a station identifier to the secure non-volatile data store; and
an authenticated operating system including the authenticated trust agent such that the authenticated trust agent is a software element of the authenticated operating system.

28. The computer program product as defined in claim 27, wherein the secure non-volatile data store comprises a flash memory device.

29. The computer program product as defined in claim 27, wherein the cryptographic data includes a device key.

30. The computer program product as defined in claim 27, wherein:
- a station identified by the station identifier comprises a mobile telephone; and
- the station identifier comprises an mobile equipment identifier.

31. The computer program product as defined in claim 27, wherein the station identifier facilitates communication with another station.

* * * * *